United States Patent [19]

Lupke

[11] Patent Number: 5,516,482
[45] Date of Patent: May 14, 1996

[54] TRAVELLING MOLD TUNNEL APPARATUS FOR SMOOTH WALLED PIPE

[75] Inventor: Manfred A. A. Lupke, Concord, Canada

[73] Assignee: Corma Inc., Ontario, Canada

[21] Appl. No.: 972,492

[22] PCT Filed: Jun. 14, 1991

[86] PCT No.: PCT/CA91/00214

§ 371 Date: Feb. 8, 1993

§ 102(e) Date: Feb. 8, 1993

[87] PCT Pub. No.: WO92/22416

PCT Pub. Date: Dec. 23, 1992

[51] Int. Cl.⁶ .............................. B29C 49/04; B29C 47/30
[52] U.S. Cl. .................. 264/508; 264/167; 264/209.3; 425/326.1; 425/393; 425/396
[58] Field of Search .......................... 264/508, 563, 264/565, 167, 209.3, 209.4; 425/532, 538, 539, 396, 393, 326.1

[56] References Cited

U.S. PATENT DOCUMENTS

| | | |
|---|---|---|
| 3,998,579 | 12/1976 | Nordström ........................ 425/393 |
| 4,003,685 | 1/1977 | Maroschak . |
| 4,038,011 | 7/1977 | Lemelson . |
| 4,365,948 | 12/1982 | Chaplain ........................ 264/508 |
| 4,534,923 | 8/1985 | Lupke ........................ 425/532 |
| 4,681,526 | 7/1987 | Lupke ........................ 425/532 |
| 4,721,594 | 1/1988 | Järvenkylä ........................ 264/508 |
| 4,865,797 | 9/1989 | Järvenkylä ........................ 264/508 |
| 4,900,503 | 2/1990 | Hegler et al. ........................ 264/508 |
| 4,983,347 | 1/1991 | Rahn ........................ 264/508 |

FOREIGN PATENT DOCUMENTS

| | | |
|---|---|---|
| 0291136 | 11/1988 | European Pat. Off. . |
| 0385465 | 9/1990 | European Pat. Off. . |
| 3725286 | 2/1989 | Germany . |
| 3921075 | 1/1991 | Germany . |
| 58-148736 | 9/1983 | Japan ........................ 264/563 |

*Primary Examiner*—Catherine Timm
*Attorney, Agent, or Firm*—Beveridge, DeGrandi, Weilacher & Young

[57] ABSTRACT

An apparatus for making smooth walled tube (20) in a travelling mold tunnel (26) includes corrugations (32) for traction of tube being molded. An extrusion nozzle (16) having an exit angle of 45° or more may provide additional advantage.

28 Claims, 7 Drawing Sheets

TRAVELLING MOLD TUNNEL APPARATUS FOR SMOOTH WALLED PIPE

TECHNICAL FIELD

This invention relates to apparatus for and a method of production of generally smooth walled tube in a travelling mold tunnel.

BACKGROUND ART

In the past, it has been possible to produce a corrugated tube or ribbed tube formed of thermoplastics material by extrusion of a tubular parison into a travelling mold tunnel and molding the external surface of the tube on a mold surface of the mold tunnel. The mold tunnels themselves may be provided in a variety of different manners. For example, a mold tunnel may be formed of two co-operating chains of mold block parts which close together along a forward run to form the mold tunnel in any manner, For example, mold block parts may be hinged together to close so that adjacent mold blocks form a mold tunnel and to open at a downstream end of the mold tunnel to release tube from therein, or may be separate and close to form the tunnel by means of co-operating parallel runs of blocks. A conventional apparatus for provision of a mold tunnel for a single walled corrugated tube is described and claimed in U.S. Pat. No. 3,981,663 issued to Gerd P. H. Lupke on Sep. 21, 1976. A travelling mold tunnel utilizing mold block parts which are hinged together and which open at a downstream end of a molding run to release tube form therein is described and claimed in PCT Patent Application CA90/00327 which was published on May 16, 1991 under the publication number WO91/06419 (now U.S. Pat. No. 5,372,774). One particular apparatus for the production of ribbed pipe is described and claimed in U.S. Pat. No. 4,712,993 issued to Manfred A. A. Lupke on Dec. 15, 1987. The patents and patent application referred to are mentioned by way of example only. Numerous publications are available concerning modifications of previously known apparatus.

It has generally been believed that the use of a travelling mold tunnel is not possible for making smooth walled tube. In all cases of the use of a travelling mold tunnel for making corrugated or ribbed tube, the mold tunnel is provided with an annularly or helically grooved mold surface to form annular or helical grooved corrugations or ribs in the resulting product. Such grooves in the wall of the mold tunnel are filled, during molding, with a layer or mass of thermoplastic material. As the mold tunnel advances, such layer or mass in a groove of the mold wall acts to provide traction acting to help drag the parison or partially molded tube forward along the length of the mold tunnel.

The presence of such grooves in the wall of a travelling mold tunnel are necessary for molding purposes when corrugated or ribbed tube is being formed and their use as transport aids may either have been unappreciated or rarely or never discussed. It has, however, been appreciated that it is not possible to form smooth walled tube by means of a conventional travelling mold tunnel. This is, in fact, due to the lack of traction for the tube during the molding process. Thus, a travelling mold tunnel which has an entirely smooth wall will have no traction means to help drag the parison or material being molded with it as it advances. When ribbed tube is formed, it has been necessary to provide spaces between the ribs which are not so great that the thermoplastics material tends to slip in the mold in that region. If the ribs are too widely spaced apart, the flow of plastic will not be even and slippage will occur between the unset thermoplastics material and the mold tunnel. Resultant ugly, weakened, roughened patches or wavey lines present on the surface indicate irregular transport of the material due to slippage in the mold.

In some cases, when ribbed tube is being provided, it has been the practice to make such tube with main ribs which are spaced apart by as much as one inch or more, the main ribs upstanding from the surface of the tube by as much as an inch or more. The distance between the main ribs may be provided with smaller riblets in the form of annular bands which upstand from the surface of the tube by a small amount. The provision of these annular riblets has been primarily for the purpose of providing seats for O-rings or for strength purposes of the tube or for reasons of appearance. Generally, one, two or three such bands may be provided in the interval between main ribs; although more than three such bands may be present. However, it is believed that no appreciable number has been used.

Corrugated tube made by conventional methods in a travelling mold tunnel may be provided with belled or otherwise shaped sections by the provision of special mold blocks. Such sections have traditionally had smooth walls but are usually short in length and have not caused any major difficulties in production. Such short sections of plain walled belled tube are provided, for example, for sockets for joining two lengths of tube together. The production of similar belled lengths of ribbed tube has caused considerably more difficulty. Ribbed tube is formed in a travelling mold tunnel by injection molding of a parison of thermoplastics material between an inner forming plug and the mold tunnel molding surface. This injection molding process in a travelling mold is much more prone to shearing of the thermoplastic parison in molding due to difficulties of precise control in transporting the parison with the mold.

Smooth walled tubing having no ribs or corrugations on either its inner or outer surfaces has traditionally been made using different elaborate apparatus. A parison of thermoplastic material may be either extruded over a core to form the inner surface or into a vacuum mold. Beyond the initial forming stage, various cooling jackets and other equipment is necessary. The production line for smooth walled tubing tends to be longer than that which is possible using a travelling mold tunnel. Travelling mold tunnels, however, have not been found suitable for the production of smooth walled tubing due to the difficulties in transporting the parison without shear between an inner forming plug and an outer mold tunnel.

If it had been possible to use a travelling mold tunnel for the production of smooth walled tubing, it is believed the process might well have been an injection molding process as used for ribbed tubing rather than the less critical blow molding process used for corrugated tube. It is, as previously commented, just such an injection molding process which causes the most difficulties with shear in the transport of the parison in the travelling mold tunnel. Hypothetical future developments apart, it is generally believed that the molding of smooth walled .tube in a travelling mold tunnel is not practicable.

Consideration of the difficulties involved in the production of ribbed tubing in a travelling mold tunnel in which the interval between main ribs is sufficiently long that one rib is fully formed before the formation of another is started, has been considered in U.S. Pat. No. 4,900,503, but the thrust of that disclosure is towards the proper filling of the rib cavities. There is no consideration of molding smooth walled tube. In that patent of Wilhelm Hegler, there is described and claimed a method and apparatus for the production of ribbed pipe in which the intervals between the ribs are provided with saw tooth annular snags due to the provision of saw tooth shaped indentations in the mold tunnel for the purpose of transportation of the parison.

DISCLOSURE OF THE INVENTION

It has now been surprisingly discovered that the production of essentially smooth walled tube in a travelling mold tunnel is possible. It is not necessary to provide the sharp saw tooth annular projections of U.S. Pat. No. 4,900,503. The provision of nearly any very shallow corrugations in the mold tunnel may provide sufficient traction to reduce the tendency to slippage between the thermoplastics material and the mold tunnel. Defects due to slippage are correspondingly reduced. The tube produced may have shallow fluting on its surface which is either so slight as to be barely noticeable or may be sufficiently emphasized to be an appearance enhancement.

Accordingly, there is provided apparatus for the extrusion of smooth inner walled and generally smooth outer walled thermoplastic material tube comprising a forwardly travelling mold tunnel for molding an outer wall of the tube, the mold tunnel comprising aligned adjacent mold blocks, the mold tunnel having an upstream end and a downstream end and an elongate cylindrical tunnel bore extending between the ends;

the mold blocks being formed by co-operating mold block parts which, at the upstream end of the mold tunnel, close to provide a closed mold block having a mold block bore forming part of the tunnel bore and which, at the downstream end of the mold tunnel, open to release the tube formed within the tunnel;

an extrusion die for thermoplastic material having an elongate extrusion nozzle for extruding a parison of thermoplastic material into the mold tunnel;

cylindrical mold blocks bore walls, and hence a tunnel bore wall, being provided with shallow corrugations to aid transport of the tube being molded, the depth of the corrugations being small with respect to the tube thickness and the width of the corrugations being greater than the depth.

The apparatus may be of any travelling mold type. In particular, the apparatus may be of the type in which the parison is pressed against the tunnel mold surface by air pressure, or of the type in which the parison is injected between the tunnel mold surface and a cylindrical cooling mandrel located within the mold tunnel and spaced from the mold surface thereof by a distance corresponding to the desired tube thickness.

Means should be provided to return mold blocks from the downstream end of the mold tunnel to the upstream end of the mold tunnel. This may be accomplished by providing two endless claims of mold block parts which come together along forward runs of both claims so that mold block parts co-operate to form closed mold blocks and a mold tunnel. Alternatively, mold block parts may be hinged to close at the upstream end of the mold tunnel and open at the downstream end of the mold tunnel, a return mechanism being provided to return mold blocks to the upstream end. Such a system is described and claimed in U.S. Pat. No. 5,372,774.

The corrugations comprise alternating shallow grooves and ridges, the width of the grooves being at least as great as that of the ridges. The grooves and ridges may have generally rectangular radial cross-section, possibly the corners of which being rounded. Alternatively, the grooves and ridges of curvilinear outline, for example in the form of a sine wave. The actual size in terms of depth and width of the corrugations is dependent on the diameter of the tube and the thickness of the tube wall. It is believed that such choice is within the scope of the man skilled in the art. The sizes may be varied outside any tunnels which make the traction ridges of the tube substantially unnoticeable, if it is desired to provide a decorative tube finish.

Purely by way of example, to give some guidance as to possibility of variation, it is commented that for tube of inside diameter of 200 mm, having wall thickness of 2.3 mm, upstanding ribs of the tube (grooves of the mold) may be provided of a height of, say 0.15 to 2.00 mm. The width of the ribs (grooves of the mold) may be, say 1 to 8 mm (the ribs comprising not more than 2% of the tube diameter). The separation of the ribs may be in a somewhat similar range but need not be the same as the rib width.

Annular corrugations or helical corrugations are both effective in providing traction for the tube which is being molded. The degree of effectivity is dependent upon the spacing height, configuration and width of the corrugations. Other configuration of corrugation may be possible such as alternatively raised and depressed squares hexagous or other patterns which may result in attractive outer surfaces of the tubes.

The invention includes a method of making thermoplastics tube using the described apparatus of the invention. The invention is of considerable importance in conjunction with conveyor apparatus for a travelling mold tunnel of the type having a carrier for each mold block, or when the mold block parts are completely separated one from the other, i.e. not hinged, for each mold block part. In this type of apparatus, mold blocks may be removed from their carriers and replaced by mold blocks of different configuration. For example, in that type of apparatus, it is possible to place an entire set of mold blocks with others configured for a different diameter tube. Moreover, it is possible to change one or two mold blocks to provide for belled sections of tube or other configurations.

Now, by means of the invention, it is possible not only to make essentially smooth walled tube in a travelling mold tunnel but also to provide relatively long sections of smooth walled tube in otherwise differently configured tube. The apparatus and method of the invention are especially useful in providing the enlarged socket end and co-operating spigot of the tube described and claimed in Canadian patent application No. 2,032,729 in the name of Stefan Lupke.

An important feature of the present invention concerns the orientation of the extrusion nozzle. While it may be possible to mold essentially smooth walled tube with a reduced amount of shear defects by utilization of the inventive apparatus and method thus far disclosed, further improvement is possible if the exit angle of the extrusion nozzle is at least 45° as described and claimed in U.S. Pat. No. 4,936,765 issued to Manfred Lupke on Jun. 26, 1990.

BRIEF DESCRIPTION OF THE DRAWINGS

Embodiments of the invention will now be described with reference to the drawings in which.

MODES OF CARRYING OUT THE INVENTION

Figure 1:
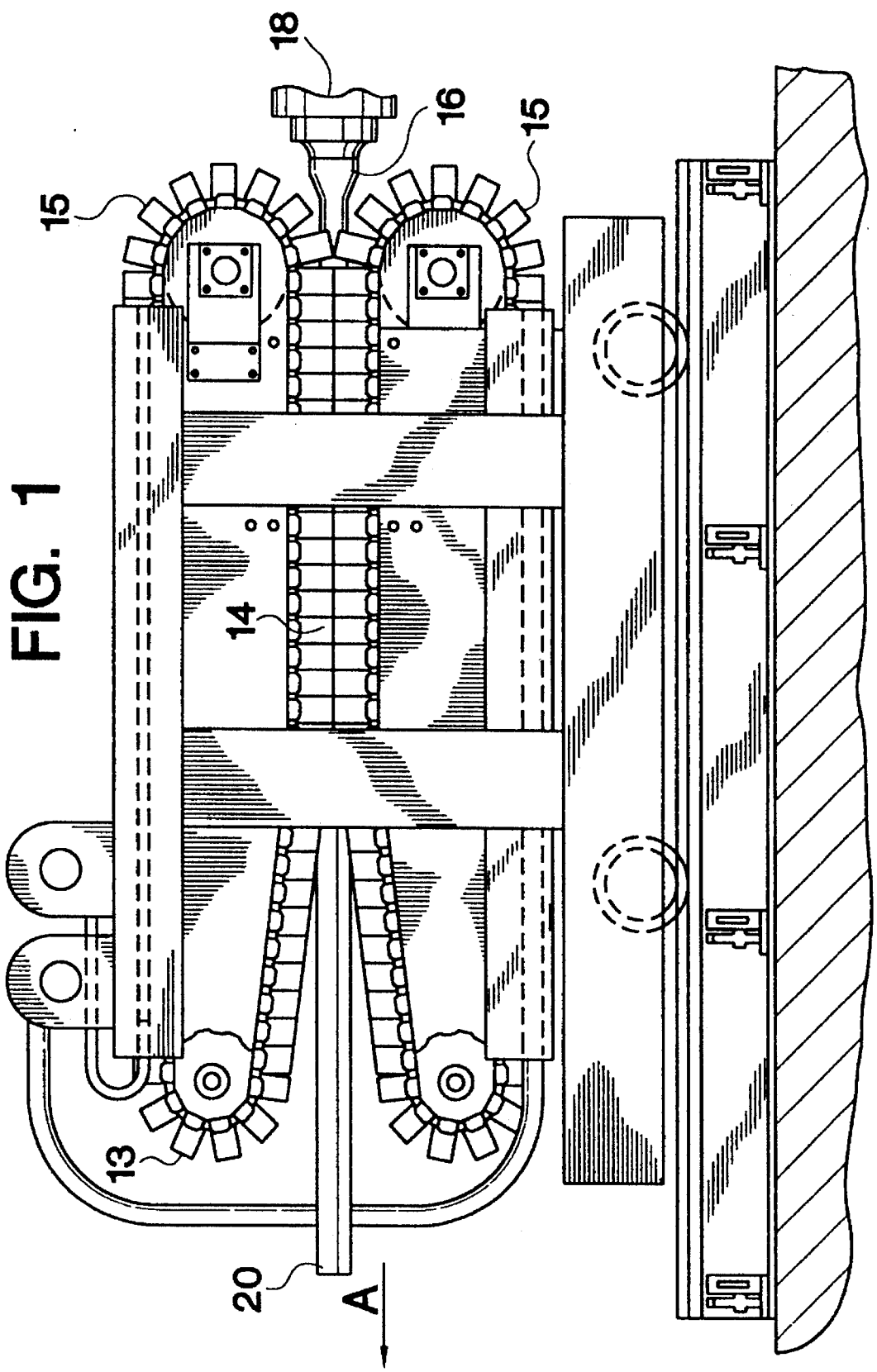
FIG. 1 is a perspective sketch of one type of mold tunnel apparatus.
Figure 2:
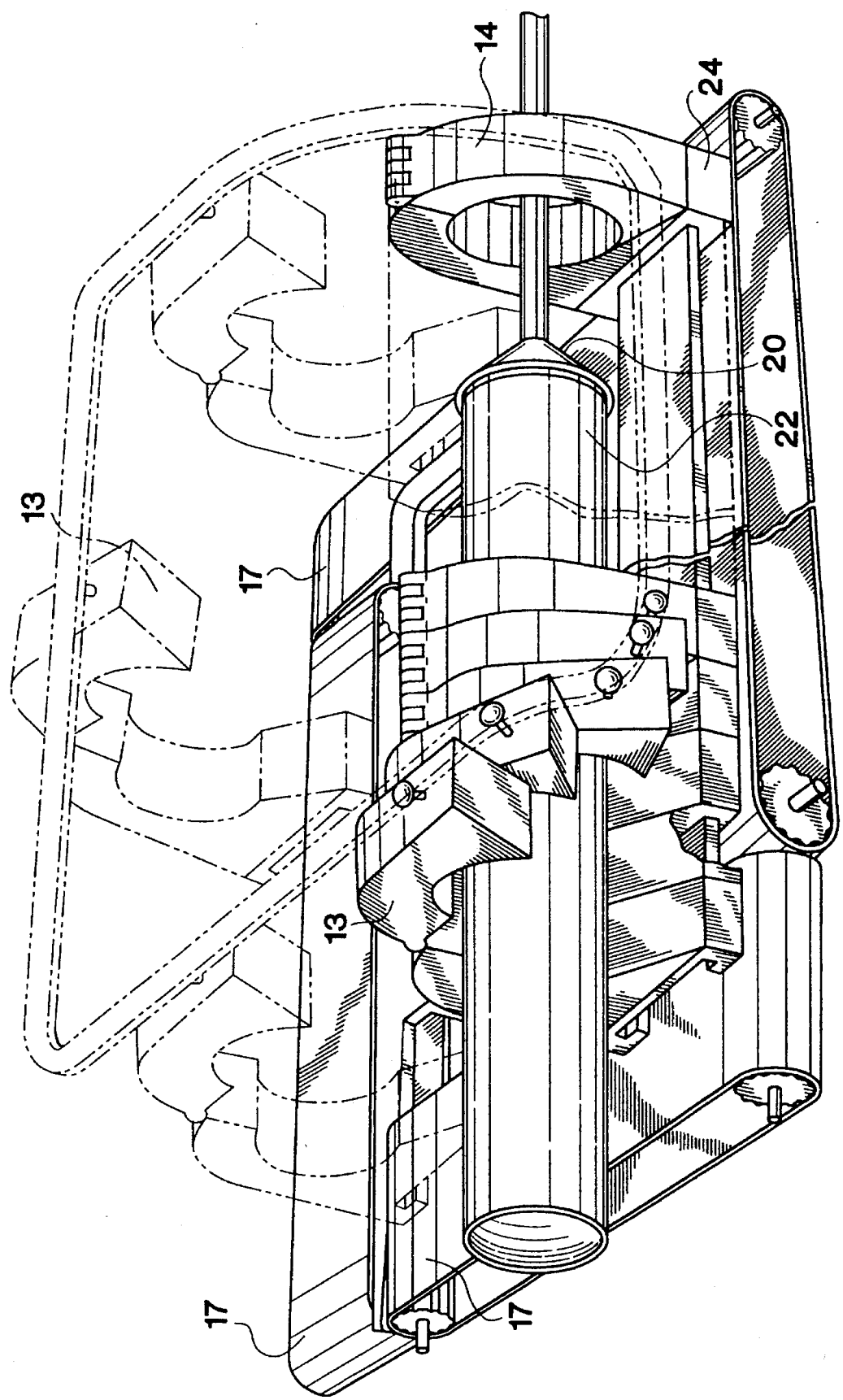
FIG. 2 is a sketch of another type of mold tunnel apparatus.

FIGS. 1 and 2 of the drawings show sketches of different systems of providing travelling mold tunnels. In FIG. 1, two endless chains of mold block parts 13 of mold blocks 14 are provided. The mold block parts 13 circulate on a pair of endless chains 15 which bring co-operating mold block parts together to form the mold tunnel on a forward run of the chains. The mold tunnel travels in the direction of arrow A. An extrusion nozzle 16 of extrusion die 18 enters an upstream end of the mold tunnel to extrude a parison of thermoplastics material against an inner cylindrical mold surface of the mold tunnel. The parison of thermoplastics materials is continuously transported from the extrusion nozzle with the travelling mold tunnel to emerge at a downstream end of the mold tunnel as molded tube 20.

FIG. 2 shows different apparatus in which the mold block parts 13 are hinged together to form closed molds 14 at an upstream end of the mold tunnel and open by means of any suitable arrangement at the downstream end of the mold tunnel. The hinged together mold block parts 13 are then transported back to the beginning of the mold tunnel by transport belts 17 where they close to form the mold tunnel again. In FIG. 2 the mold tunnel has not been shown as a complete run of aligned adjacent mold blocks but separation is shown between them so that the tube being formed inside the mold tunnel may be broken away to show the extrusion nozzle 20 and a part of a cooling plug 22 within the mold tunnel. FIG. 2 also gives an indication that the mold blocks 14 are carried by carrier blocks 24 to which they are interchangeably linked. It is, thus, only necessary to replace mold blocks 14 by mold blocks of different configuration to provide tube of a different configuration, e.g. tube of a different diameter or ribbed tube or belled tube, etc.

Figure 3:
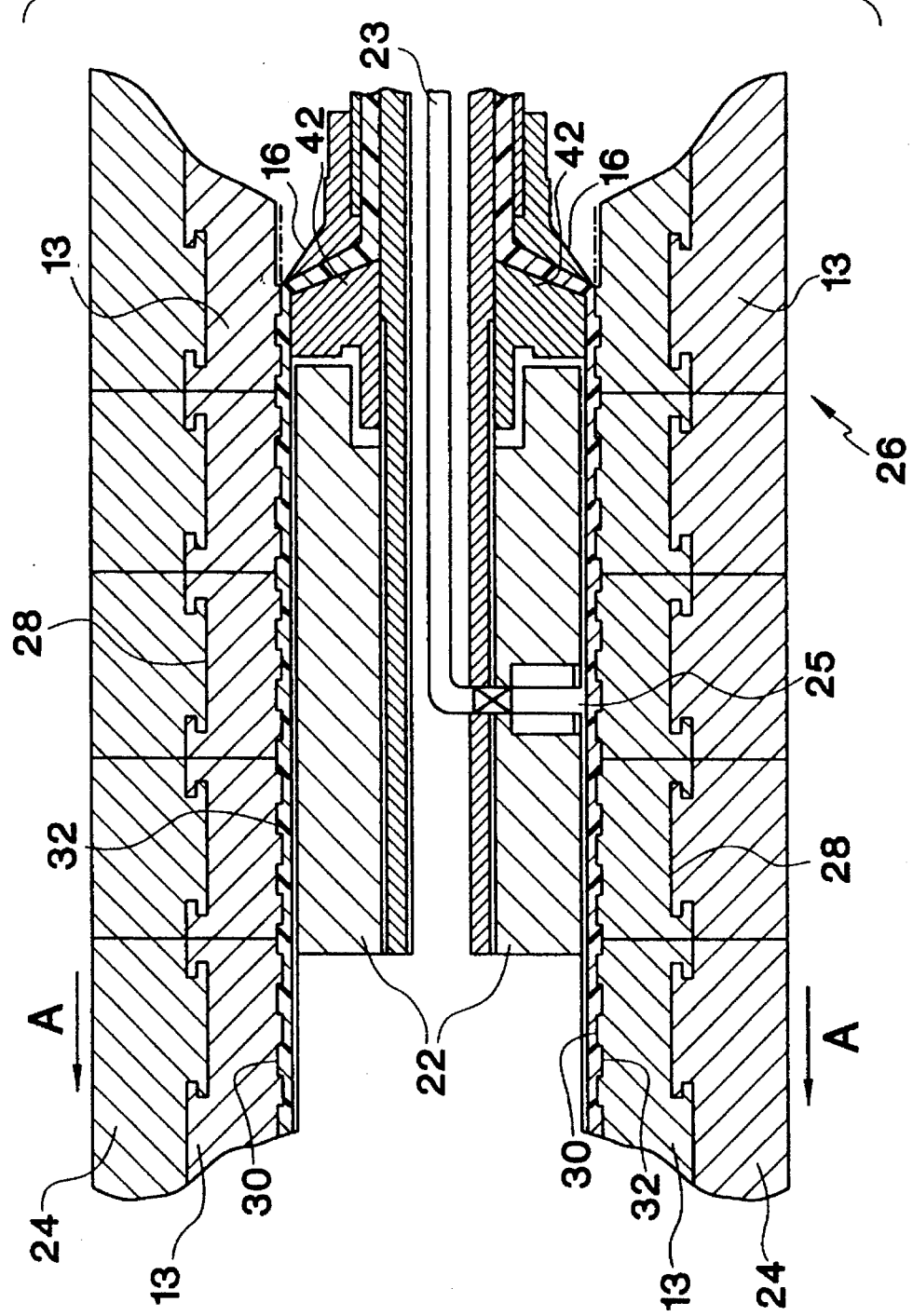
FIG. 3 is a longitudinal cross-section through a mold tunnel and extrusion nozzle for the manufacture of essentially smooth walled tube.
Figure 4:
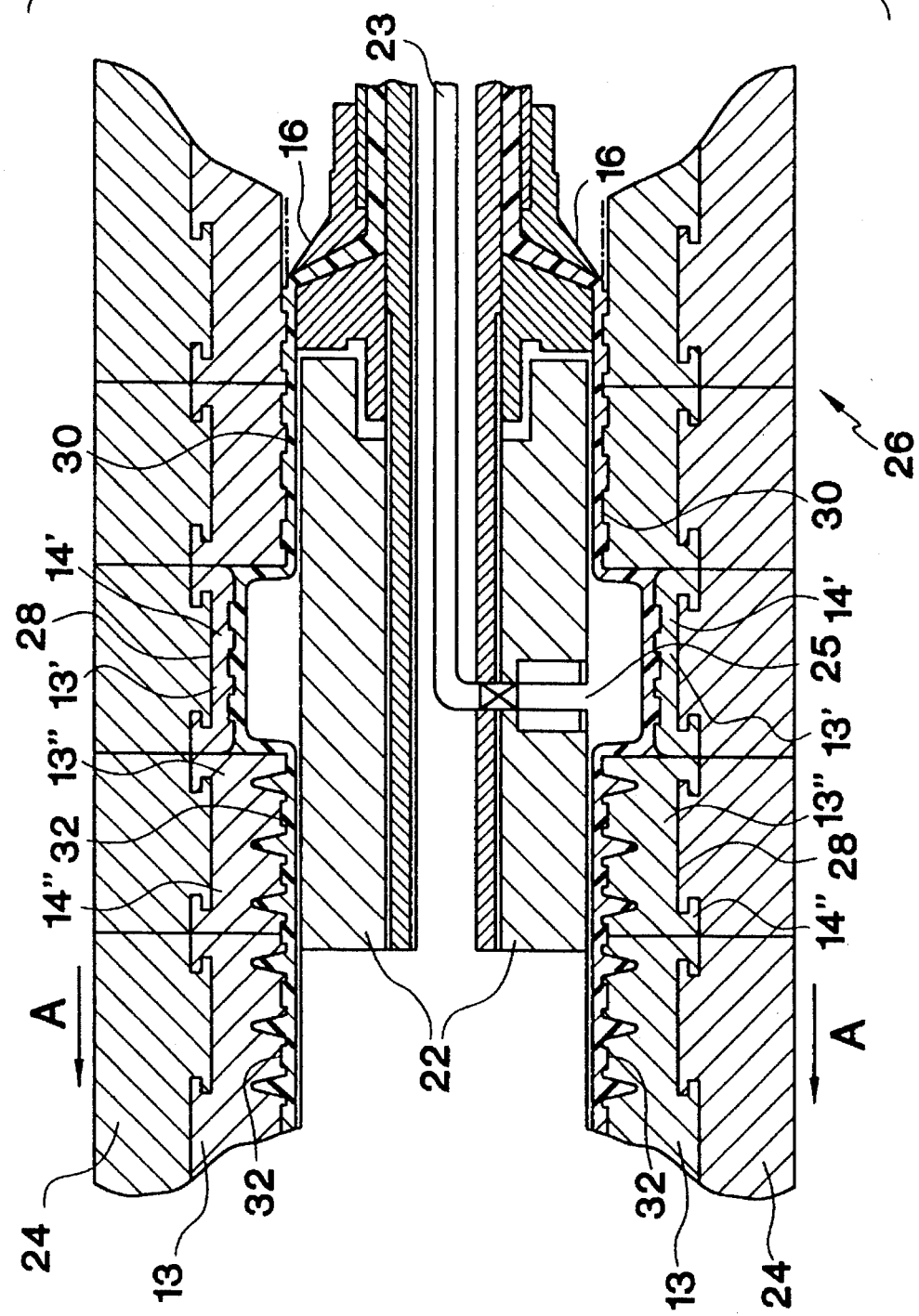
FIG. 4 is a longitudinal section through a mold tunnel modified by the presence of special purpose mold blocks.

FIG. 3 shows a cross-section of a part of the mold tunnel which is generally indicated at 26. Mold block parts 13 are each carried on a carrier block 24 by means of tongue and groove connection 28 running at right angles to the direction of travel of the mold tunnel. The tongue and groove connection 28 allows interchange of mold blocks having a different configuration of mold face into and out of the system at any stage. Thus, a modified mold tunnel as shown in FIG. 4 may be produced by interchanging mold block parts 13 for co-operating pairs of mold block parts 13' of mold blocks 14' to produce bells in the resulting tube or mold block parts 13" of mold blocks 14" meant to produce sections of ribbed tubing.

Within the mold tunnel, the cooling plug 22 is arranged to mold the inner surface of tube in the mold tunnel. The cooling plug 22 may be provided with an internal pressure line 23 opening to the exterior surface of the plug 22 at port 25. This pressure line may be used to bias plastics material into any mold blocks 14 of increased diameter such as are used for belled tubing. The cooling plug 22 is arranged to receive plastic material over its surface directly from extrusion nozzle 16. Thus if extrusion nozzle 16 is of generally conical form, the cooling plug 22 may have an upstream conical end which projects into the extrusion nozzle to form a conical passage between the nozzle and the cooling plug to direct extrudate towards a mold surface 30 of the mold tunnel 26.

The mold surface 30 of mold tunnel 26 comprises the inner mold surfaces of the mold block parts 13. As shown in FIGS. 3 and 4, the mold block parts 13 are of the type used in apparatus shown in FIG. 1. However, they may equally suitably be mold block parts hinged together for apparatus exemplified in FIG. 2.

The travelling mold tunnel 26 moves in the direction of arrow A as indicated in FIGS. 1, 2, 3 and 4. If the mold tunnel surface 30 were to be wholly smooth and suitable for mold release without sticking on opening of the mold blocks 14 into their component parts 13, it may be seen that there might be a considerable tendency for slippage of the mold blocks with respect to the parison extruded thereinto from extrusion nozzle 16. Such slippage might well be random in occurrence leading to shear in the thermoplastics material of the parison resulting in ugly defect marks in the finished product. However, as shown, the mold tunnel surface is supplied with means to reduce random slippage of the parison within the mold tunnel. Thus, the mold tunnel surface 30 is corrugated with very shallow corrugations which act to provide traction to drag the parison with the mold tunnel towards its downstream end.

Figure 5:
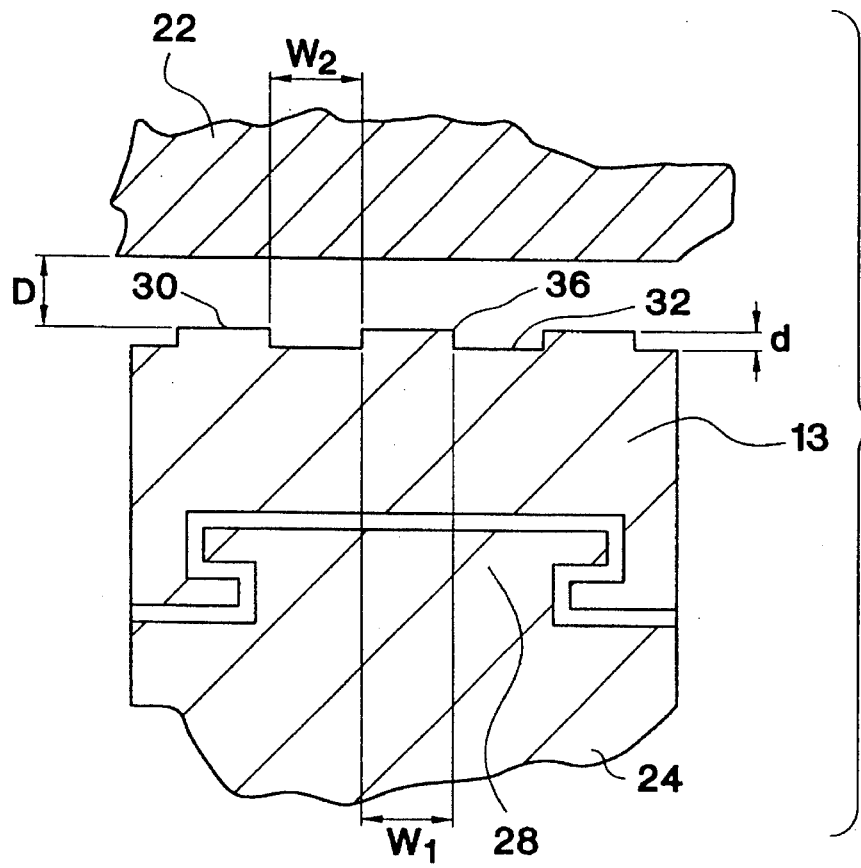
FIG. 5 is an enlargement of a cross-section of a detail of one suitable mold surface of mold blocks of FIG. 3.
Figure 6:
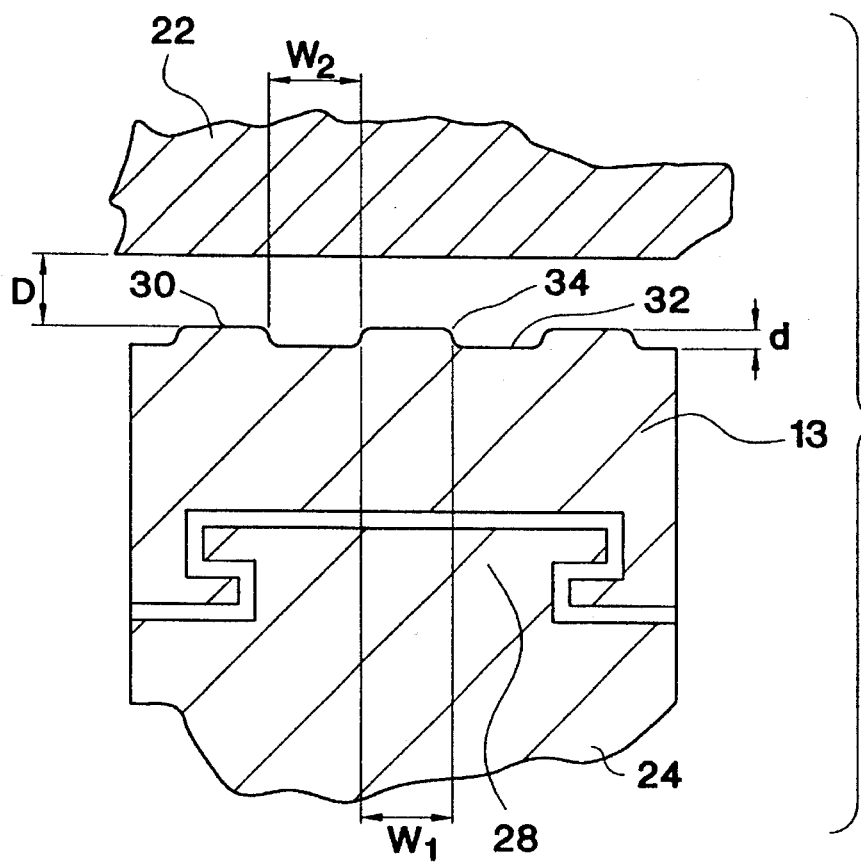
FIG. 6 is an enlargement of a cross-section of a detail of other suitable mold surface of mold blocks of FIG. 3.
Figure 7:
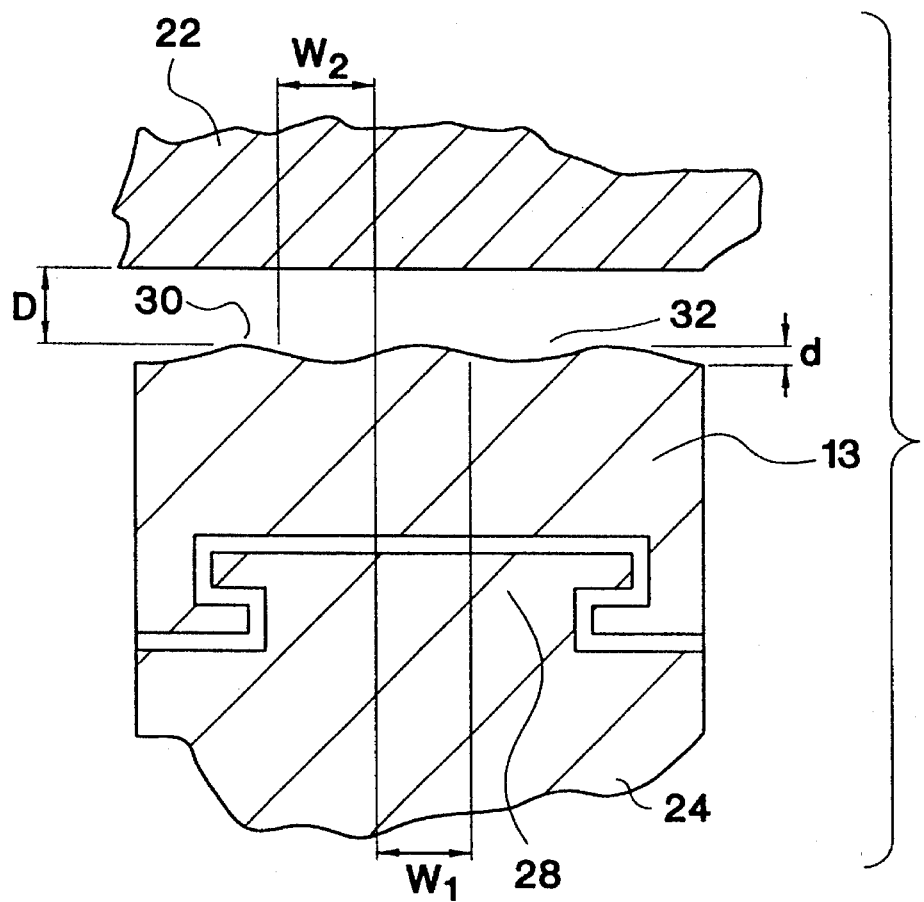
FIG. 7 is an enlargement of a cross-section of a detail of yet another suitable mold surface of mold blocks of FIG. 3.

The corrugations 32 of the mold tunnel 30 are depicted in enlarged form in FIGS. 5, 6 and 7 which show a mold block part 13 linked to a carrier block 24 through tongue and groove connection 28. A detail of cooling plug 22 is also indicated. FIG. 5 shows corrugations 32 of rectangular cross-section. The depth d of each corrugation is small in comparison with the distance D between the cooling plug and the nearest point of mold tunnel surface 30. The distance D corresponds to the thickness of the extruded parison in the mold tunnel and, indeed, to the thickness of the resulting molded tube 20. It should be emphasized that, while the presence of a cooling plug 22 is illustrated, the inner tube surface may alternatively be formed by blow molding. The illustration of the cooling plug is at least a convenience for delineating the thickness of the tube. The markings on the surface of the resulting tube 20 may, therefore, be insignificant. The width $W_1$ of ridges of the corrugations 32 and the width $W_2$ of troughs of the corrugations need not be the same. Each of these widths should be small enough that no undue shear as a result of loss of traction occurs in the tube being molded. The widths $W_1$ and $W_2$ may, as illustrated, be appreciably greater than the depth of the corrugations d. For tube of 200 mm inside diameter, d may be, say 0.25 mm, D may be 2.3 mm, $W_1$ may be 2.6 mm and $W_2$ may be in the range of say 1–8 mm. Thus, the contribution of the corrugations (2×0.25) to the total tube diameter (>200 mm) is substantially less than 1%.

FIGS. 6 and 7 show different examples of forms of corrugation which may be used, similar parts in each of these figures being indicated by similar reference numerals. FIG. 6 shows corrugations 32 which are very similar to corrugations 30 in FIG. 5 but which have rounded corners 34 rather than the square corners 36 of FIG. 5. FIG. 7 shows corrugations 30 having an outline in the form of a sine wave. In this case the measurements of $W_1$ and $W_2$ are taken from the widest point of the corrugations as shown and probably will be similar unless the sine wave is not a true sine wave but is modified to make one of the measurements greater than the other. Such a situation is somewhat unlikely in view of the difficulty of machining.

Figure 8:
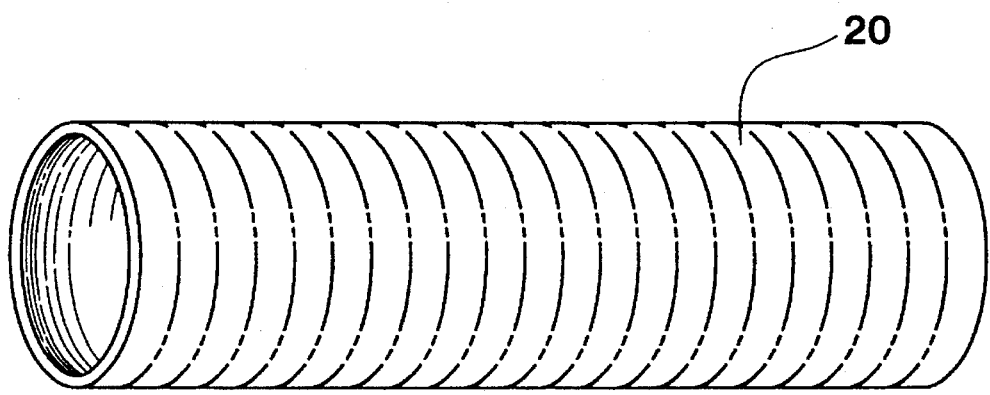
FIG. 8 is a sketch of essentially smooth walled tube which may be made in a mold tunnel such as that of FIG. 3.

FIG. 8 gives the general impression of essentially plain walled tube 20 which may be produced from the apparatus previously described in connection with FIGS. 1 to 7. It may be seen from FIG. 8 that the patterning resulting from corrugations 30 may not be particularly obvious on the surface of the tube.

Figure 9:
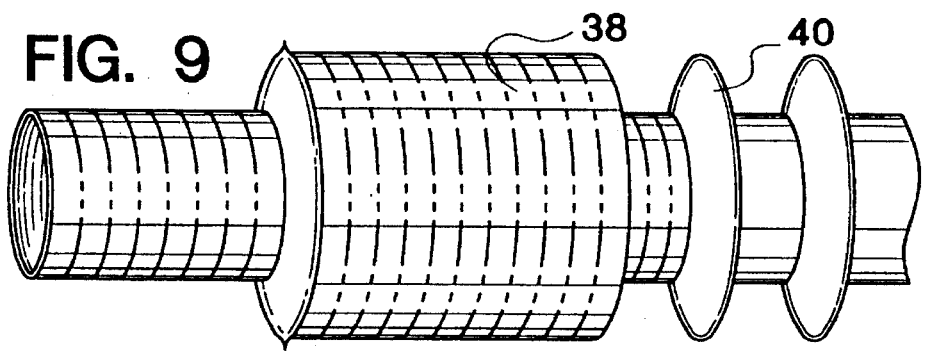
FIG. 9 shows tube molded in the mold tunnel of FIG. 4.

FIG. 9 is a similar view of tube having various different sections as obtained from the apparatus of FIG. 4. Again, the patterning is not particularly obvious especially in comparison with the belled section of tube 38 and the ribbed section of tube 40.

Figure 10:
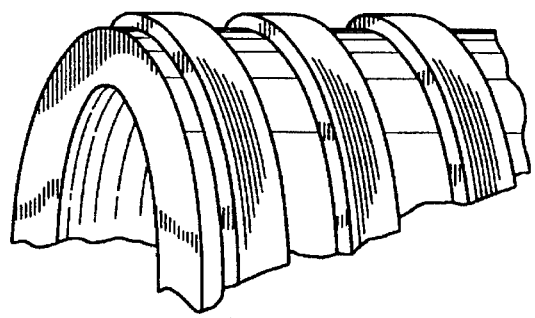
FIGS. 10–13 show additional views of other essentially smooth walled tube.
Figure 11:
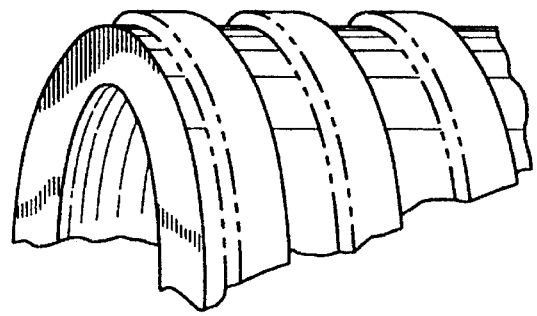
Figure 12:
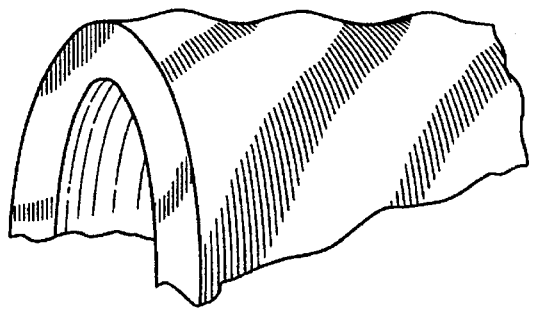

FIGS. 10, 11 and 12 are enlarged views of tube obtained from corrugations 30 as shown in FIGS. 5, 6 and 7 respectively. The patterns shown may be of a size to lend ornamentation to the surface of the tube but may be substantially unnoticeable.

Figure 13:
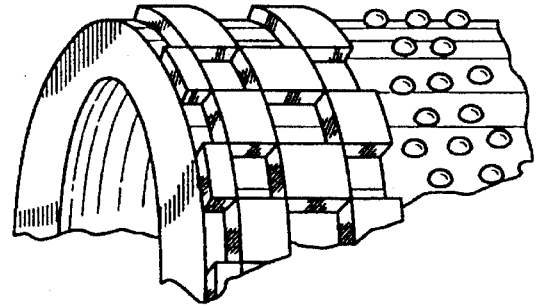

FIG. 13 illustrates an enlarged detail of tube showing various other forms of surface ornamentation which may be applied in a travelling mold tunnel by means of corrugations or indentations intended to provide traction for the parison or tube being molded. Although different forms of patterning are shown on the same tube, it is only by way of example of the possibilities envisaged within the scope of the invention. It is unlikely that different patternings will be applied to the same tube in practice.

The orientation of extrusion nozzle 16 is of considerable importance. In U.S. Pat. No. 4,936,768, the orientation of the exit angle of the extruded parison from the extrusion nozzle was extensively discussed in the production of ribbed tube. In that patent, it was described and claimed that an extrusion die for externally annularly ribbed seamless plastic tubing has an elongated nozzle within which a hollow mandrel is placed. The nozzle and mandrel define an annular extrusion orifice for extrusion of a parison. The orifice has a coaxial conical portion with its generatrix forming an angle of more than 45° with the longitudinal axis of the nozzle for efficient filling of the mold cavities corresponding to annular ribs of the formed tube. The construction of the extrusion nozzle 16 to form a conical delivery passage 19 between itself and a conical mandrel portion 42 of the cooling plug which extends into the extrusion nozzle 16 has a generatrix which forms an angle of at least 45° with the longitudinal axis of the nozzle. While, in the case of U.S. Pat. No. 4,936,768 the intention was to force extrudate into the rib cavities, the intention in the present case is to provide extrudate at the mold surface 30 with minimal impetus in the forward direction. Without wishing to be bound by any theories, it is believed that if the extrudate has impetus of its own in the forward direction movement may not be entirely even around the circumference of the mold tunnel and any unevenness may be accentuated by slippage to cause shear and resulting defects in the product.

I claim:

1. Apparatus for the extrusion of thermoplastic material tube (20) comprising a forwardly travelling mold tunnel (26) for molding an outer wall of the tube, the mold tunnel comprising a plurality of aligned adjacent mold blocks (14), the mold tunnel (26) having an upstream end and a downstream end and an elongate cylindrical tunnel bore extending between the ends;

the mold blocks (14) being formed by co-operating mold block parts (13) which, at the upstream end of the mold tunnel, close to provide a closed mold block having a mold block bore, where the plurality of adjacent mold blocks (14) establish an elongate part of the tunnel bore and which, at the downstream end of the mold tunnel, open to release the tube (20) formed within the tunnel;

an extrusion die (18) for thermoplastic material having an elongate extrusion nozzle (16) for extruding a parison of thermoplastic material into the mold tunnel;

cylindrical mold block bore walls, and hence a tunnel bore wall (3), being provided with shallow corrugations (32) to aid transport of the tube being molded, the depth of the corrugations corresponding to less than about 2% of the tube diameter and being small with respect to the tube thickness, there being no surface formations of greater than 2% of the tube diameter along the tunnel bore wall for a distance of such length that loss of traction and slippage of the tube would occur during molding if the corrugations were not present.

2. Apparatus as claimed in claim 1 in which means (15, 17) are provided to return the mold blocks from the downstream end of the mold tunnel (26) to the upstream end of the mold tunnel (26).

3. Apparatus as claimed in claim 1 in which the corrugations (32) comprise alternating shallow grooves and ridges, the width of the grooves being at least as great as that of the ridges.

4. Apparatus as claimed in claim 1 in which the corrugations comprise alternating shallow grooves and ridges having generally rectangular radial cross-section.

5. Apparatus as claimed in claim 4 in which corners (34) of the rectangular radial cross-section are rounded.

6. Apparatus as claimed in claim 1 in which the corrugations comprise alternating grooves and ridges of curvilinear outline.

7. Apparatus as claimed in claim 1 in which there is provided a cylindrical cooling mandrel (22) for molding an inner wall of the tube located within the mold tunnel (26), spaced from the tunnel bore wall by required thickness of the tube (20).

8. Apparatus as claimed in claim 1 in which means are provided to bias the thermoplastics material against the tunnel bore wall by gas pressure.

9. Apparatus as claimed in claim 1 in which the corrugations are annular and each corrugation has a height of about 1% of the tube diameter.

10. Apparatus as claimed in claim 1 in which the corrugations are helical.

11. Apparatus as claimed in claim 1 in which one or more further mold blocks forming part of the mold tunnel are present, each having a mold block bore for molding tube sections having a configured outer surface.

12. Apparatus as claimed in claim 11 in which the further mold blocks (14") are for molding belled tube sections.

13. Apparatus as claimed in claim 1 in which the mold blocks (14) are replaceably located on mold block carriers (24) and are interchangeable with mold blocks (14) having a different mold face configuration.

14. Apparatus as claimed in claim 7 in which the cylindrical cooling mandrel (22) has a conical portion (42) projecting into the extrusion nozzle (16) and in which the extrusion nozzle flares outwardly around the conical portion to form an extrusion passage (19) between the conical portion (42) and an inner surface of the extrusion nozzle, the generatrix of the extrusion passage being at least 45° to the longitudinal axis of the extrusion nozzle.

15. A method for forming tube (20) comprising the steps of:
   a) extruding a thermoplastic parison from an extrusion nozzle (16) of an extrusion die (18) into a forwardly travelling elongate mold tunnel (26);
   b) molding the parison into a tube within the mold tunnel (26) which comprises a plurality of aligned adjacent mold blocks (14), and which has an upstream end and a downstream end, an elongate cylindrical tunnel bore extending between the ends,
   the mold blocks (14) being formed by co-operating mold block parts (13) which, at the upstream end of the mold tunnel, close to provide a closed mold block (14) having an elongate cylindrical mold block bore forming part of the tunnel bores, and which, at the downstream end of the mold tunnel, open to release the tube formed within the tunnel;
   c) molding an inner wall of the tube (20);
   d) aiding transport of the tube being molded in the mold tunnel by corrugations corresponding to less than about 2% of the tube diameter and the depth of the corrugations being small with respect to the tube thickness while not aiding transport with any surface formations of greater than 2% of the tube diameter along the tunnel bore wall for a distance of such length that loss of traction and slippage of the tube would occur during molding if the corrugations were not present.

16. A method as claimed in claim 15 in which the mold blocks (14) are returned from the downstream end of the mold tunnel (26) to the upstream end of the mold tunnel (26).

17. A method as claimed in claim 15 in which the corrugations (32) comprise alternating shallow grooves and ridges, the width of the grooves being at least as great as that of the ridges.

18. A method as claimed in claim 15 in which the corrugations comprise alternating shallow grooves and ridges having generally rectangular radial cross-section.

19. A method as claimed in claim 18 in which corners (34) of the rectangular radial cross-section are rounded.

20. A method as claimed in claim 15 in which the corrugations comprise alternating grooves and ridges of curvilinear outline.

21. A method as claimed in claim 15 in which there is provided a cylindrical cooling mandrel (22) for molding inner wall of tube located within the mold tunnel (26), spaced from the tunnel bore wall by required thickness of the tube (20).

22. A method as claimed in claim 15 in which means are provided to bias the thermoplastics material against the tunnel bore wall by gas pressure.

23. A method as claimed in claim 15 in which the corrugations are annular and each corrugation has a height of about 1% of the tube diameter.

24. A method as claimed in claim 15 in which the corrugations are helical.

25. A method as claimed in claim 15 in which one or more further mold blocks forming part of the mold tunnel are present, each having a mold block bore for molding tube sections having a configured outer surface.

26. A method as claimed in claim 15 in which the further mold blocks (14") are for molding belled tube sections.

27. A method as claimed in claim 15 in which the mold blocks (14) are replaceably located on mold block carriers (24) and are interchangeable with mold blocks (14) having a different mold face configuration.

28. A method as claimed in claim 21 in which the cylindrical cooling mandrel (22) has a conical portion (42) projecting into the extrusion nozzle (16) and in which the extrusion nozzle flares (19) outwardly around the conical portion to form an extrusion passage (19) between the conical portion (42) and an inner surface of the extrusion nozzle, the generatrix of the extrusion passage being at least 45° to the longitudinal axis of the extrusion nozzle.

* * * * *